(12) United States Patent
Milousheff et al.

(10) Patent No.: US 9,208,183 B2
(45) Date of Patent: Dec. 8, 2015

(54) DATA ACCESS OF SLOWLY CHANGING DIMENSIONS

(71) Applicant: BMC Software, Inc., Houston, TX (US)

(72) Inventors: Zack Milousheff, San Jose, CA (US); Mark Hutchins, Millbury, MA (US)

(73) Assignee: BMC Software Inc., Houston, TX (US)

( * ) Notice: Subject to any disclaimer, the term of this patent is extended or adjusted under 35 U.S.C. 154(b) by 236 days.

(21) Appl. No.: 13/843,648

(22) Filed: Mar. 15, 2013

(65) Prior Publication Data

US 2014/0279977 A1    Sep. 18, 2014

(51) Int. Cl.
 *G06F 7/00* (2006.01)
 *G06F 17/30* (2006.01)
(52) U.S. Cl.
 CPC ................ *G06F 17/30309* (2013.01)
(58) Field of Classification Search
 None
 See application file for complete search history.

(56) References Cited

U.S. PATENT DOCUMENTS

| | | | |
|---|---|---|---|
| 6,480,836 B1* | 11/2002 | Colby et al. | 707/717 |
| 6,665,682 B1* | 12/2003 | DeKimpe et al. | 1/1 |
| 6,684,207 B1* | 1/2004 | Greenfield et al. | 1/1 |
| 7,251,653 B2* | 7/2007 | Huang et al. | 707/756 |
| 2001/0013030 A1* | 8/2001 | Colby et al. | 707/1 |
| 2002/0029207 A1* | 3/2002 | Bakalash et al. | 707/1 |
| 2004/0034616 A1* | 2/2004 | Witkowski et al. | 707/1 |
| 2005/0125325 A1* | 6/2005 | Chai et al. | 705/35 |
| 2008/0109740 A1* | 5/2008 | Prinsen et al. | 715/764 |
| 2010/0005114 A1* | 1/2010 | Dipper | 707/101 |
| 2011/0055257 A1* | 3/2011 | Renkes et al. | 707/769 |
| 2011/0219020 A1* | 9/2011 | Oks et al. | 707/769 |
| 2011/0264618 A1* | 10/2011 | Potdar et al. | 707/602 |
| 2013/0268567 A1* | 10/2013 | Adjei-Banin et al. | 707/812 |
| 2013/0275365 A1* | 10/2013 | Wang et al. | 707/602 |
| 2014/0279977 A1* | 9/2014 | Milousheff et al. | 707/695 |

\* cited by examiner

*Primary Examiner* — Hexing Liu

(74) *Attorney, Agent, or Firm* — Brake Hughes Bellermann LLP

(57) ABSTRACT

Disclosed is a method including storing selected historical persist dimension attribute data utilizing a row insertion without updating all previous versions of the selected persist dimension attribute, and generating a view of persisted dimension attribute data as dual values utilizing a star join.

12 Claims, 6 Drawing Sheets

305

```
                                    ┌─ 310
        ┌─────────────────────────┐
        │         D_DIM2          │
        ├─────────────────────────┤
        │ P * DIM2_ID   Integer   │
        │   * DIM2_UID  Raw(16)   │
        │   * ATTR_B1   NVARCHAR(256) ├─ 315
        │   * ATTR_B2   NVARCHAR(16)  │
        │   * START     Datetime  │
        │   * END       Datetime  │
        │   * IS_LATEST Boolean(1)│
        ├─────────────────────────┤  ┌─ 320
        │ (Key) D_DIM2_PK(DIM2_ID)│
        └─────────────────────────┘
```

| ID (355) | UID (360) | ATTR_B1 (365) | ATTR_B2 (370) | START DATE (375) | END DATE (380) | IS_LATEST (385) |
|---|---|---|---|---|---|---|
| 0 | 23 | Ma | Ct | 2-2-2007 | 4-4-2012 | False |
| 1 | 34 | Va | De | 11-23-2003 | 9-9-9999 | True |
| 2 | 37 | Va | De | 6-4-2005 | 9-9-9999 | True |
| 3 | 23 | Mi | Ma | 4-4-2012 | 9-9-9999 | True |
| : | : | : | : | : | : | : |
| : | : | : | : | : | : | : |
| : | : | : | : | : | : | : |
| n-1 | 231 | Ca | Wa | 1-20-1999 | 2-22-2011 | True |
| n | 8 | Va | De | 10-9-2000 | 9-9-9999 | True |

FIG. 3B

DATA ACCESS OF SLOWLY CHANGING DIMENSIONS

FIELD

Embodiments relate to storing and accessing slowly changing persistent data (e.g., dimensions) in data warehouse (e.g., database) technologies.

BACKGROUND

A data warehouse may be a database used for decision support activities (e.g., reporting and data analysis). The data warehouse may be a central repository created by integrating and persisting (e.g., saving changes over time) historical data from multiple data sources. One of the most often used relational structures for persisting data warehouse data is a "star schema". The entities of a star schema are typically divided into two categories. The two categories typically include facts and dimensions. Facts may persist measures of a business activity (e.g., cost incurred by use of vendor services) while dimensions persist reference information about a measurable event (e.g., date/time of the incurred cost, vendor: set of pertinent attributes, client: set of pertinent attributes, and/or the like). The historical aspect of data within a data warehouse is central to the persistence implementation. History may be tracked within the fact tables (e.g., incurred cost is being persisted daily, weekly, bi-weekly, monthly, quarterly and/or the like) and within the dimensions as the dimensional attributes change with time (ex: vendor risk factor).

The changing dimensions are often called slowly changing dimension (SCD) because the changes within the dimensions are infrequent and irregular. The historical persistence aspect of dimensions is accomplished by different types of SCDs. The types of SCDs may include (1) Type 0—no action; (2) Type 1—attributes are overwritten as changes occur—no new records are created; (3) Type 2—changes of attributes cause new records to be persisted; (4) Type 3—new columns are created for attributes for which current and previous historical values are being persisted; (5) Type 4—data is persisted in two dimensional tables—dimensional table with current attribute set and history table; and (6) Type 6—combination of Type 1, Type 2, and Type 3.

For accurate data analysis (e.g., trending, data mining), relating coherently dimensional historical information to fact historical data is necessary for the successful implementation of the data warehouse. Typically, the 2-fold data access required in many data warehouse use cases is to relate fact data in particular time interval to historically correct for the time interval value of some dimensional attribute and/or current (latest known) value of another or the same attribute. Currently, there is no known solution for accurate persistence and efficient access of slowly changing dimensions (SCD) type 6 when utilizing a star join.

SUMMARY

One embodiment includes a method including storing selected historical persist dimension attribute data utilizing a row insertion without updating all previous versions of the selected persist dimension attribute, and generating a view of persisted dimension attribute data as dual values utilizing a star join.

Another embodiment includes a data warehouse including a database, at least one processor, and at least one memory. The at least one memory storing code segments that when executed by the processor cause the processor to generate a configuration structure to store information indicating a dimension attribute to be historically persisted, generate a plurality of data tables in the database, each of the plurality of data tables including an associated schema, the associated schema including current attribute data, history attribute data, effective date data for the attribute, and data indicating an attribute is current, and store selected historical persist dimension attribute data utilizing a row insertion without updating all previous versions of the selected persist dimension attribute.

Still another embodiment includes a method including associating foreign key columns of a fact table with a column identifying dimension data of at least one dimension data table, the association being a star join, and generating a view configured to convert row data to column data based on the star join, the column data being dual values.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein:

FIG. 3A illustrates a schema for a data table to store persistent data according to at least one example embodiment.

FIG. 3B illustrates a data table to store persistent data according to at least one example embodiment.

Figure 1:
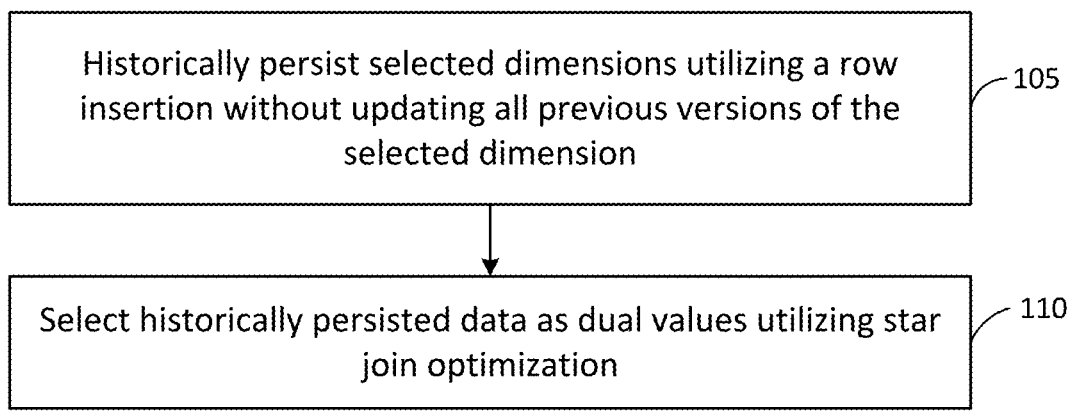
FIG. 1 illustrates a block diagram for persisting and selecting data according to one or more example embodiments.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION OF THE EMBODIMENTS

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

As discussed above, there is no known solution for accurate persistence and efficient access of slowly changing dimensions (SCD) type 6 when utilizing a star join. A star join may use bitmap filtering for improving the performance of some types of queries by the effective retrieval of rows from fact tables. Data warehouses may employ dimensionally modeled star or snowflake schemas. These schemas may have one or more associated fact tables that contain transactional data and many dimension tables that define the fact table data. The dimension tables may store information such as product data, customer information, and times and dates. Foreign keys may be utilized for maintaining relationships between rows in the fact tables and between rows in the dimension tables.

Star join query optimization may automatically implemented by the data warehouse database (e.g., SQL Server™, Oracle™). Star join query optimization may not require a special database or application configuration. The query processor may optimize queries. The queries may use hash joins to join the dimension and fact tables utilizing the foreign keys to identify the matching rows. The optimization process may use the hash tables for deriving bitmap filters.

The key values from each dimension table may be identified by bitmap filters. The key values may qualify for inclusion in the query. When the fact table is scanned, the bitmap filters may be applied to the fact table. The bitmap filters may eliminate rows of the fact table not qualified for inclusion in the result set. The star join process becomes more efficient, because the eliminated rows do not need further processing (e.g., the subsequent filters need not be applied to the eliminated rows).

The conventional implementation of Type 6 slowly changing dimension (SCD) data persistence has performance and storage implications. For example, conventional type-6 SCD persistence inflates the dimensional storage (e.g., increases the size of the dimension data table) and slows the load of the dimension. The inflation is caused by introduction of satellite columns (e.g., additional columns in the data table to store the persistence data) within the dimension table to hold historical and current attribute values. The slowing of the load is result of updating all of the versions of the dimension with the current value of the attribute upon insertion of a new version of the dimension.

Example embodiments provide a dimensional persistence structure, metadata layer, and uniform SQL access layer to reduce data inflation and increase load performance. In addition, example embodiments efficiently access data utilizing a star join of the fact table data to the dimension table data.

FIG. 1 illustrates a block diagram for historically persisting and selecting data according to one or more example embodiments. As shown in FIG. 1 example embodiments historically persist (e.g., store historical data) selected dimensions (e.g., of a dimensions table) utilizing a row insertion (as opposed to a column insertion) without updating all previous versions of the selected dimension (block 105). For example, rows are added to the dimension table to store historical data for selected attributes of a dimension table. The historical data is updated without updating each of a plurality of previously persisted data.

According to example embodiments historically persisted data is selected as dual values utilizing star join optimization (block 110). For example, queries of fact tables joined with dimension tables are optimized using a star join. For example, no return queries without star join are required. For example, the persist data may be returned in columns as <current, history> pairs.

Figure 2:
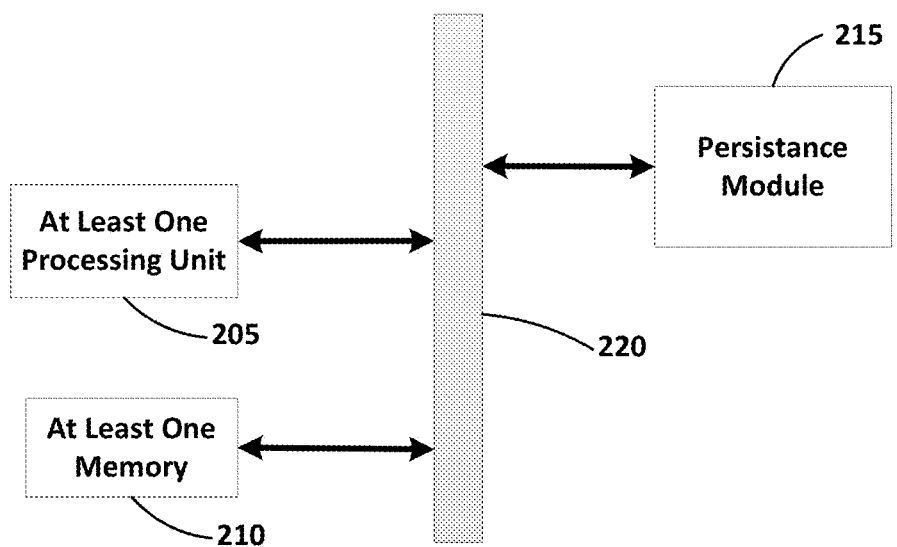
FIG. 2 illustrates a block diagram of an apparatus according to at least one example embodiment.

FIG. 2 illustrates a block diagram of an apparatus according to at least one or more example embodiments. As shown in FIG. 2, the apparatus 200 includes at least one processing unit 205, at least one memory 210, and a persistence module 215. The at least one processing unit 205, the at least one memory 210, and the persistence module 215 are communicatively coupled via bus 225. The apparatus 200 may be, for example, a software module or an integrated circuit (e.g., application-specific integrated circuit).

In the example of FIG. 2, the apparatus 200 may be at least one computing device and should be understood to represent virtually any computing device configured to perform the methods described herein. As such, the apparatus 200 may be understood to include various standard components which may be utilized to implement the techniques described herein, or different or future versions thereof. By way of example, the apparatus 200 is illustrated as including the at least one processing unit 205, as well as at least one memory 210 (e.g., a computer readable storage medium).

Thus, as may be appreciated, the at least one processing unit 205 may be utilized to execute instructions stored on the at least one memory 210, so as to thereby implement the various features and functions described herein, or additional or alternative features and functions. Of course, the at least one processing unit 205 and the at least one memory 210 may be utilized for various other purposes. In particular, it may be appreciated that the at least one memory 210 may be understood to represent an example of various types of memory and related hardware and software which might be used to implement any one of the modules described herein. Systems and/or methods described below may include data and/or storage elements. The data and/or storage elements (e.g., data base tables) may be stored in, for example, the at least one memory 210.

The persistence module 215 may be configured to persist selected dimensions utilizing a row insertion without updating all previous versions of the selected dimension. The persistence module may be further configured to select persisted data utilizing star join optimization. For example, rows are added to the dimension table to store historical data for selected attributes of a dimension table. The historical data is updated without updating each of a plurality of previously persisted data. For example, queries of fact tables joined with dimension tables are optimized using a star join. The persistence module 215 may store data and/or code that when executed by the at least one processing unit 205 performs the functions associated with the persistence module 215. The persistence module 215 may be a standalone hardware module including a processor (not shown) configured to perform the associated functions. Further descriptions of the functions of the persistence module 215 are described below.

FIG. 3A illustrates a schema for a data table to store persistent data according to at least one example embodiment. As shown in FIG. 3A, the schema 305 includes three elements. A first element 310 may include the table name (e.g., D_DIM2). In the subject disclosure table names may include a naming convention in that table names starting with a "D_" are tables that include dimensions and table names starting with a "F_" are tables that include facts. A second element 315 may be columns (or attributes) and their associated datatype. Although seven columns with their associated datatypes are shown, example embodiments are not limited thereto.

Through out this specification, dimension and attribute may be used interchangeably with the understanding that the attribute is associated with some form of data and the dimension is the data table in which the data is stored. Therefore, when a dimension is persisted, it is because the attribute data is to be saved as historical data.

A third element 320 may be primary key selections. Database tables should have one or more columns designated as the primary key. The value the primary key holds should be unique for each record in the database. The database management (e.g., Oracle™) system may enforce the uniqueness of the primary key. For example, insertion of a record into a table with a primary key that duplicates an existing record (e.g., duplicates the primary key) should fail. Other types of keys may exist. For example, another type of key is a foreign key. These keys are used to create relationships between tables. However, there is no uniqueness constraint for a foreign key. Table 305 includes a primary key as indicated in the third element 320 as indicated by "D_DIM2_PK(DIM2_ID)" and the "P" next to column DIM2_ID in the second element 315. There are no foreign keys indicated in data table 305.

Data table 305 may be used to store persistent data. The second element 315 of the schema for data table 305 may include two attribute columns (e.g., ATTR_B1 and ATTR_B2). One of the attributes may be used to store the latest or current value for the attribute and the other attribute may be used to store historical or persistent data values. The second element 315 of the schema for data table 305 may further include two date/time columns (e.g., START and END). The first date/time column (e.g., START) may be used to indicate a date and/or time at which a current value for the attribute first became valid. The second date/time column (e.g., END) may be used to indicate a date and/or time at which a value for the attribute became historical (or invalid as a current value). The second element 315 of the schema for data table 305 may further include a column used to indicate the latest or current value for the attribute (e.g., IS_LATEST). Utilizing (e.g., storing and retrieving data) data table 305 is described in more detail below.

FIG. 3B illustrates a data table to store persistent data according to at least one example embodiment. As shown in FIG. 3B, data table 350 is based on the schema (e.g., includes the columns described with regard to the second element 315) of data table 305. Data table 350 is used to describe stored data based on the schema of table 305.

As shown in FIG. 3B, includes columns 355 to 385 corresponding the columns described with regard to the second element 315. The "ID" column 355 unique integers (e.g., 0-n) to uniquely identify (as a primary key) each recordset stored in table 350. The column "UID" 360 may be used to uniquely identify a stored attribute. However, there may be any number of recordsets for the stored attribute. For example, according to example embodiments, there may be one recordset including the latest or current value for the attribute and more than one recordsets including the historical or persist values for the attribute. The attribute may be any data identifying, for example, a quality or characteristic associated with someone or something. For example, an attribute may be an employee identification, a department number, a state, a country, a salary of an employee, and the like. For example, table 305 may show a state that an employee lives in. Therefore, column "UID" 360 may include an employee identification number. Further, ATTR_B1 365 may include the employee's state (e.g., Ma, Ct, Va, De, etc.) in which the employee currently resides. ATTR_B2 370 may include the employee's state (e.g., Ma, Ct, Va, De, etc.) in which the employee last resided. ATTR_B2 370 may be empty or "NULL" if the employee has never lived in another state while employed.

In order to indicate the latest or current state the employee is living, the column IS_LATEST 385 is a Boolean value where a "True" indicates the state is the latest or current state and a "False" indicates the state is not the latest or current (or is a historical) state. For example, ID 355="0" includes information about the state employee number 23 (UID 360="23") lives or has lived in. IS_LATEST 385="False", therefore, this is a historical (or persist) recordset. As a result, the recordset indicates employee number 23 lived in Ma (ATTR_B1="Ma") between Feb. 2, 2007 (START DATE 375="2-2-2007") and Apr. 4, 2012 (END DATE 380="4-4-2012"). For some time before Feb. 2, 2007 employee number 23 lived in Ct (ATTR_B2="Ct"). There may be another recordset in data table 350 including information about the time spent in Ct. Further, recordset 3 (ID 355="3") indicates employee number 23 moved from Ma to Mi on Apr. 4, 2012 and currently lives in Mi (IS_LATEST 385="True" and END DATE 380="9-9-9999").

Figure 4:
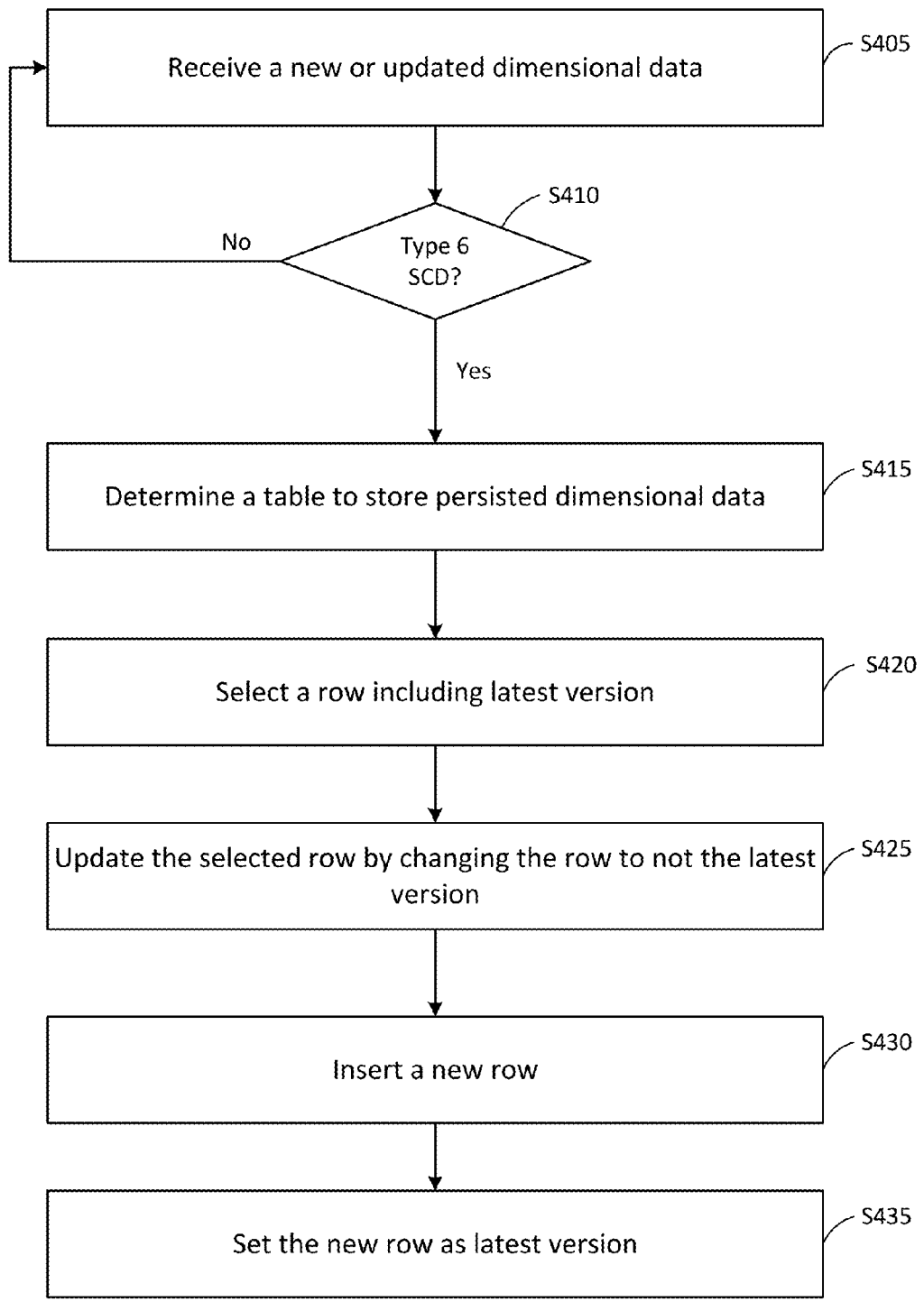
FIG. 4 illustrates a method for storing persistent data according to at least one example embodiment.

FIG. 4 illustrates a method for storing persistent data according to at least one example embodiment. The method steps described with regard to FIG. 4 may be executed as software code stored in a memory (e.g., at least one memory 210) associated with a system (e.g., as shown in FIG. 2) and executed by at least one processor (e.g., at least one processor 205) associated with the system. For example, the processor may be associated with one or more of the blocks (e.g., the persistence module 215) or the apparatus 200. However, alternative embodiments are contemplated such as a system embodied as a special purpose processor.

For example, the method steps may be performed by an application-specific integrated circuit, or ASIC. For example, the ASIC may be configured as one or more of the blocks (e.g., the persistence module 215) and/or the apparatus 200. Although the steps described below are described as being executed by a processor, the steps are not necessarily executed by a same processor. In other words, at least one processor may execute the steps described below with regard to FIG. 4.

As shown in FIG. 4, in step S405 a processor (e.g., at least one processing unit 205) receives a new or an updated dimensional data. For example, the data may be received as a result of an "UPDATE" command on a table. For example the table may be data table 305 and/or 350. For example, continuing the example described above, the update may be to indicate employee number 23 has moved from Ma to Mi.

In step S410 the processor determines if the dimensional data is Type-6 SCD. Dimensional data (and/or attributes) to be historically persisted (in this case as Type-6 SCD) may be determined during a design or upgrade process of a data warehouse (e.g., database). During this process, dimension tables are designed such that the dimension tables can store the Type-6 SCD data (e.g., data table 305 and 350) according to example embodiments. Further, a configuration structure may be created to store information about which dimension attributes should be includes as Type-6 SCD. For example, a configuration file and/or a data table configured to store configurations may be created to store information indicating a dimension attribute is Type-6 SCD.

The processor may look-up (e.g., query) the data table configured to store configurations and/or read the configuration file in order to determine if any of the data associated with updated dimensional data is Type-6 SCD. For example, continuing the example described above, the processor may use the configuration file and/or the data table configured to store configurations to determine if the state an employee lives in is Type-6 SCD (e.g., to be stored as historical data). If the processor determines the dimensional data is Type-6 SCD, processing continues to step S415. Otherwise, processing returns to step S405.

In step S415 the processor determines a table to store the persisted dimensional data. For example, as discussed above, during a design process persist tables are designed. The determined table should be the designed table which should be the table referenced in the UPDATE command. However, example embodiments contemplate persisted data being stored in a separate table. In this case, the table may be indicated in the configuration file and/or the data table configured to store configurations. For example, continuing the example above, the table may be table 305 and/or 350. The UPDATE command may indicate table D_DIM2 as the table to be updated.

In step S420 the processor selects a row including a latest version. For example, the processor may execute a query (e.g., SELECT ... FROM ... ) such that the query returns the row including the latest version. For example, continuing the example above, the processor executes a query that selects every column from the D_DIM2 table where UID 360="23" and IS_LATEST 385="True". The result of this query should result in returning a single row (note that at this stage in the process the row should be ID 355="0" because the example is moving the employee from Ma to Mi).

In step S425 the processor updates the selected row by changing the row to not the latest version. For example, the processor indicates the current row as being persisted (or historic) and selects the current date as an end date for the selected row. For example, continuing the example above, the processor changes the selected row (e.g., ID 355="0") value for column IS_LATEST 385 to "False" and END DATE 380 to todays date (or an effective date) (e.g., "4-4-2012" as shown).

In step S430 the processor inserts a new row. For example, the processor may execute an INSERT command on the table. For example, continuing the example above, the processor inserts a new row in the D_DIM2 data table (data table 350) with UID 360="23", ATTR_B1 365="Mi", ATTR_B2 370="Ma", START DATE 375=todays date (or an effective date) (e.g., "4-4-2012" as shown), END DATE 380="9-9-9999", and IS_LATEST 385 to "True". The new row ID 355=the next sequential number (e.g., "3" as shown in data table 350).

In step S435 the processor sets the new row as the latest version. As discussed above, inserting the new row may include marking the new row as the latest version. However, indicating the row as the latest version may be done as a separate step. For example, continuing the example above, the processor sets IS_LATEST 385 to "True" for the new row (e.g., ID 355="3").

Figure 5:
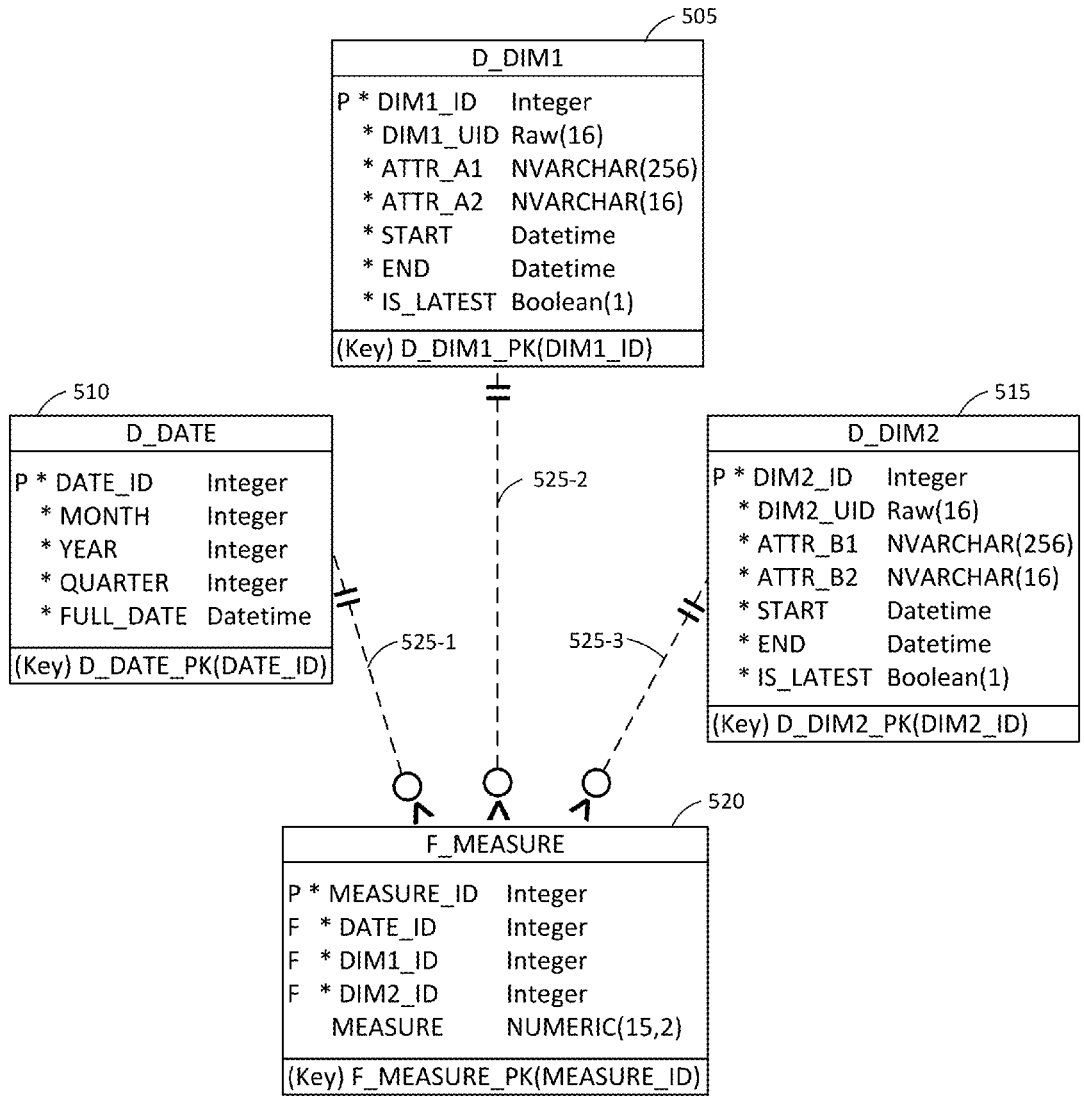
FIG. 5 illustrates a star join query schema according to at least one example embodiment.

FIG. 5 illustrates a star join query schema according to at least one example embodiment. As discussed above, in star join queries the key values from each dimension table may be identified by bitmap filters. The key values may qualify for inclusion in the query. When the fact table is scanned, the bitmap filters may be applied to the fact table. The bitmap filters may eliminate rows of the fact table not qualified for inclusion in the result set. The star join process becomes more efficient, because the eliminated rows do not need further processing (e.g., the subsequent filters need not be applied to the eliminated rows).

As shown in FIG. 5, the star join query schema includes four data tables 505 to 520, three dimension data tables 505, 510, 515 and one fact data table 520. Of the three dimension data tables 505, 510, 515, dimension data tables 505 and 515 include persistent data and the schema for each of dimension data tables 505 and 515 are substantially similar to table 305 described above. Dimension data table 510 does not include persistent data.

The star join query schema includes three joins 525-1 to 525-3. Join 525-1 joins column DATE_ID (Foreign Key) in fact data table 520 with DATE_ID (Primary Key) in dimension data table 510. Join 525-2 joins column DIM1_ID (Foreign Key) in fact data table 520 with DIM1_UID in dimension data table 505. Join 525-3 joins column DIM2_ID (Foreign Key) in fact data table 520 with DIM2_UID in dimension data table 515.

Contrary to the conventional join for slowly changing dimensions (SCD) type 6, the star join query schema of FIG. 5 filters both the key values for the current data and the persisted data from each dimension table. Both the key values for the current data and the persisted data are filtered in the dimension table because both the current data and the persisted data are stored in rows. By contrast, in the conventional join, persisted data is stored in added columns. As a result, in conventional systems, at least one additional filter (for each dimension table) is necessary for the persistent columns which are then merged with the current data results. The additional filter can not take advantage of a star join.

In addition, in order to accommodate for dual value access (e.g., access to both the current or latest value and persistent or historical value(s)), historically correct attribute value in respect to a snapshot validity interval (e.g., a timeframe over which the historical data is requested) and latest attribute value an dual access view may be created. The dual access view may be self-joining of the type-6 dimension historical version of the dimensional record with the latest version of the same record. The join may represented by (based on data table 515) <d_hist.dim2_uid=d_curr.dim2_uid and d_curr.is_latest_version=1>, where 1 is "True".

The dual access view may ensure that the result set includes column values for the type 6 attributes in the view's projection from both a historically correct and a current version for the same dimensional identity. The historically correct attribute values for the corresponding snapshot validity interval may be represented by attr_b1_hist and attr_b2_hist. The current attribute values may be represented by attr_b1_curr and attr_b2_curr. The snapshot validity interval and is_latest_version is returned from the historically correct dimensional record. An example view definition may be:

```
CREATE OR REPLACE VIEW D_DIM2_V
AS
  SELECT d_hist.dim2_id dim2_id,
    d_hist.attr_b1 attr_b1_hist,
    d_curr.attr_b1 attr_b1_curr,
    d_hist.attr_b2 attr_b2_hist,
    d_curr.attr_b2 attr_b2_curr,
    d_hist.start_datetime start_datetime,
    d_hist.end_datetime end_datetime,
    d_hist.is_latest_version is_latest_version
  FROM d_dim2 d_hist
  JOIN d_dim2 d_curr
  ON (d_hist.dim2_uid = d_curr.dim2_uid AND
    d_curr.is_latest_version = 1);
```

When the dual access view is joined to the fact table F_MEASURE on DIM2_ID (which is joined to DIM2_UID), the historical id of the dimensional record, the view result set returns the dimensional dual value set (historical and current) of its type 6 attributes ATTR_B1 and ATTR_B2 as two columns in the dual access view.

Figure 6:
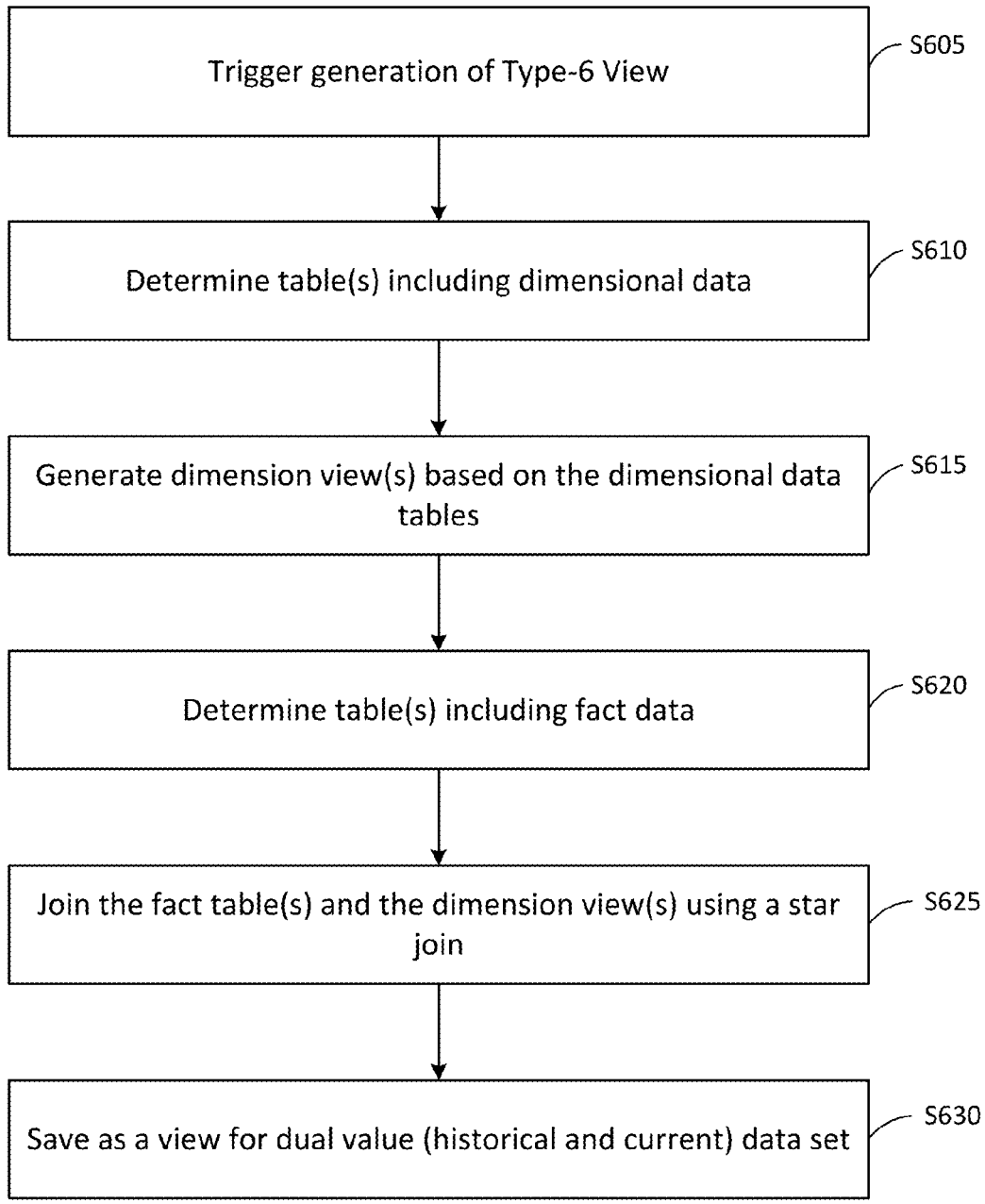
FIG. 6 illustrates a method for selecting dual value access persistent data according to at least one example embodiment.

FIG. 6 illustrates a method for generating a dual access view according to at least one example embodiment. The method steps described with regard to FIG. 6 may be executed as software code stored in a memory (e.g., at least one memory 210) associated with a system (e.g., as shown in FIG. 2) and executed by at least one processor (e.g., at least one processor 205) associated with the system. For example, the processor may be associated with one or more of the blocks (e.g., the persistence module 215) or the apparatus 200. However, alternative embodiments are contemplated such as a system embodied as a special purpose processor.

For example, the method steps may be performed by an application-specific integrated circuit, or ASIC. For example, the ASIC may be configured as one or more of the blocks (e.g., the persistence module 215) and/or the apparatus 200. Although the steps described below are described as being executed by a processor, the steps are not necessarily executed by a same processor. In other words, at least one processor may execute the steps described below with regard to FIG. 6. Implementation of generating a dual access view may be accomplished using a stored procedure (e.g., a SQL stored procedure. Therefore, some of the steps associated with FIG. 6 may include associated code segments to further illustrate an example implementation. However, example embodiments are not limited to the example code segments. The code segments may be executed together as a stored procedure in a data warehouse (e.g., database).

As shown in FIG. 6, in step S605 a processor (e.g., at least one processing unit 205) detects a trigger for generation of a Type-6 SCD view. For example, a change in metadata on which the Type-6 SCD is saved may generate a trigger. For example, the table in which Type-6 SCD is stored may have an associated trigger for data change. The processor may detect the trigger to start the process of generating a Type-6 SCD view.

In step S610 the processor determines table(s) including the Type-6 SCD. For example, as shown in FIG. 5, tables D_Dim1 505 and D_DIM2 515 may include historical data and current data of Type-6 SCD. By contrast table D_Date 510 may not.

In step S615 the processor generates a dimensional view(s) based on the Type-6 SCD table(s). For example, the view (e.g., CREATE OR REPLACE VIEW D_DIM2_V) may be modified to select data from one or both of tables D_Dim1 and D_DIM2. Alternatively, or in addition to, each of tables D_Dim1 505 and D_DIM2 515 may be used to generate more than one view. The resultant dimension view(s) may be saved to provide access to the current and historical Type-6 SCD data.

snapshot validity interval (e.g., a time over which the data is requested).

```
-- create view header and fixed part
v_sql := 'CREATE OR REPLACE VIEW ' || substr(p_dimension_name,1,28) || '_v'
|| ' AS
 SELECT ' || 'd_hist.'||v_dim_id_col||',' ||'
   d_hist.start_datetime,
   d_hist.end_datetime,
   d_hist.is_latest_version';
-- add uid attributes - no need to double - they stay the same across dimension
versions
 for rec in (
  select dimension_attribute, dimension_attribute_type
  from dimension_attribute_types
  where dimension_name = p_dimension_name
    and is_dim_uid = 1
    and dimension_attribute not in ('start_datetime', 'end_datetime', 'is_latest_version')
 )
 loop
   v_sql := v_sql || ',
   d_hist.' || rec.dimension_attribute;
 end loop;
-- add regular attributes - if type 6 - double them
 for rec in (
  select dimension_attribute, dimension_attribute_type
  from dimension_attribute_types
  where dimension_name = p_dimension_name
    and is_dim_id = 0 and is_dim_uid = 0
    and dimension_attribute not in ('start_datetime', 'end_datetime', 'is_latest_version')
 )
 loop
   if rec.dimension_attribute_type = 6 then
     v_sql := v_sql || ',
   d_curr.' || substr(rec.dimension_attribute,1,25) ||''
||substr(rec.dimension_attribute,1,25) ||'_curr,';
   end if;
   v_sql := v_sql || '
   d_hist.' || substr(rec.dimension_attribute,1,25) ||' '||
substr(rec.dimension_attribute,1,25) ||'_hist';
 end loop;
 v_sql := v_sql ||'
 from ' || p_dimension_name || ' d_hist' ||'
 join ' || p_dimension_name || ' d_curr' || '
   on ( 1 = 1 ';
 for rec_2 in (
  select dimension_attribute
  from dimension_attribute_types
  where dimension_name = p_dimension_name
    and is_dim_uid = 1
 )
 loop
   v_sql := v_sql || '
   and d_hist.' || rec_2.dimension_attribute || '=' || 'd_hist.' || rec_2.dimension_attribute;
 end loop;
 v_sql := v_sql ||'
```

```
    and d_curr.is_latest_version = 1)';
end if;
dbms_output.put_line(v_sql);
execute immediate (v_sql);
```

In step S620 the processor determines table(s) including fact data. For example, as shown in FIG. 5, table F_Measure 520 may include fact data. In step S625 the processor joins the fact table(s) and the dimension view(s) using a star join. For example, a view based on table D_Dim1 505 and a view based on table D_DIM2 515 may be substituted for tables D_Dim1 505 and D_DIM2 515 in the schema described above with regard to FIG. 5 respectively.

In step S630 the processor saves the resultant schema as a view (or database object) for dual value (e.g., historical and current) data. The resultant schema may be called, joined, and utilized as any data object (e.g., table or view) for access to current and historical Type-6 SCD data and associated fact data.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

We claim:

1. A method comprising:
    storing selected historical persist dimension attribute data utilizing a row insertion without updating all previous versions of the selected persist dimension attribute, the storing including,
        updating a dimension record by changing an end date of the dimension record and indicating the record is not current, and
        inserting a new record including indicating the new record as current, setting an attribute to a new value and setting a start date, wherein the selected persist dimension attribute data is Type-6 slowly changing dimensional data; and
    generating a view, the view including,
        current dimension attribute data and persisted dimension attribute data as dual values utilizing a star join, the star join causing row data to be converted to column data, and
        at least one row a dual value pair including only persisted dimension attribute data corresponding to the current dimension attribute data of another row.

2. The method of claim 1, wherein storing selected historical persist dimension attribute data includes,
    generating a configuration structure to store information indicating a dimension attribute to be persisted, and
    selecting the historical persist dimension attribute based on the stored information.

3. The method of claim 1, further comprising:
    generating a dimension data table including current attribute data, history attribute data, effective date data for the attribute, and data indicating an attribute is current.

4. The method of claim 1, wherein generating the view includes,
    associating foreign key columns of a fact table with a column identifying dimension data of at least one dimension table,
    the association being a star join.

5. The method of claim 1, wherein the view includes a snapshot validity interval.

6. A data warehouse comprising:
    a database,
    at least one processor, and
    at least one memory storing code segments that when executed by the processor cause the processor to,
        generate a configuration structure to store information indicating a dimension attribute to be historically persisted,
        generate a plurality of data tables in the database, each of the plurality of data tables including an associated schema, the associated schema including current attribute data, history attribute data, effective date data for the attribute, and data indicating an attribute is current,
        store selected historical persist dimension attribute data utilizing a row insertion without updating all previous versions of the selected persist dimension attribute, the storing including,
            updating a dimension record by changing an end date of the dimension record and indicating the record is not current, and
            inserting a new record including indicating the new record as current, setting an attribute to a new value and setting a start date, wherein the selected persist dimension attribute data is Type-6 slowly changing dimensional data, and
        generate a view configured to convert the row data to column data based on a star join, the column data being dual values, the view including,
            corresponding current attribute data and history attribute data as the dual values, and
            at least one row a dual value pair including only persisted dimension attribute data corresponding to the current dimension attribute data of another row.

7. The data warehouse of claim 6, wherein storing selected persist dimension attribute data includes,
    generating a configuration structure to store information indicating a dimension attribute to be historically persisted, and
    selecting the historical persist dimension attribute based on the stored information.

8. A method, comprising:
    associating foreign key columns of a fact table with a column identifying dimension data of at least one dimension data table, the association being a star join, the dimension data is Type-6 slowly changing dimensional data, and
    generating a view configured to convert row data to column data based on the star join, the column data being dual values, the view including,
        current dimension attribute data and persisted dimension attribute data as the dual values, and
        at least one row a dual value pair including only persisted dimension attribute data corresponding to the current dimension attribute data of another row.

9. The method of claim 8, wherein each of the dimension data tables includes an associated schema, the associated schema including current attribute data, history attribute data, effective date data for the attribute, and data indicating an attribute is current.

10. The method of claim 8, wherein the dual values include the current attribute data and the history attribute data.

11. The method of claim 8, wherein generating the view includes,
associating foreign key columns of a fact table with a column identifying dimension data of at least one dimension table,
the association being a star join.

12. The method of claim 8, wherein the view includes a snapshot validity interval.

* * * * *